(12) United States Patent
Hunt

(10) Patent No.: US 9,934,538 B2
(45) Date of Patent: Apr. 3, 2018

(54) RECALLING CROP-SPECIFIC PERFORMANCE TARGETS FOR CONTROLLING A MOBILE MACHINE

(71) Applicant: Deere & Company, Moline, IL (US)

(72) Inventor: Timothy S. Hunt, Davenport, IA (US)

(73) Assignee: Deere & Company, Moline, IL (US)

( * ) Notice: Subject to any disclaimer, the term of this patent is extended or adjusted under 35 U.S.C. 154(b) by 583 days.

(21) Appl. No.: 14/495,212

(22) Filed: Sep. 24, 2014

(65) Prior Publication Data

US 2016/0086291 A1 Mar. 24, 2016

(51) Int. Cl.
*G06Q 50/02* (2012.01)
*A01D 41/127* (2006.01)
*G05B 15/02* (2006.01)
*G06Q 10/06* (2012.01)
*H04L 29/08* (2006.01)

(52) U.S. Cl.
CPC .......... *G06Q 50/02* (2013.01); *A01D 41/127* (2013.01); *G05B 15/02* (2013.01); *G06Q 10/06393* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 4,934,985 A | 6/1990 | Strubbe | |
| 5,666,793 A | 9/1997 | Bottinger | |
| 5,956,255 A * | 9/1999 | Flamme | A01B 79/005 111/903 |
| 6,167,337 A * | 12/2000 | Haack | E02F 9/26 222/63 |
| 6,205,384 B1 * | 3/2001 | Diekhans | A01D 41/127 172/4.5 |
| 7,272,558 B1 * | 9/2007 | Soucy | G06F 17/30746 704/235 |
| 7,946,367 B2 | 5/2011 | Good | |
| 8,019,517 B2 | 9/2011 | Boenig et al. | |
| 8,244,434 B2 | 8/2012 | Matthews | |
| 8,280,595 B2 | 10/2012 | Foster et al. | |

(Continued)

FOREIGN PATENT DOCUMENTS

DE 102013106128 A1 6/2014
DE 102013106131 A1 6/2014

(Continued)

OTHER PUBLICATIONS

European Search Report in Foreign counterpart application No. 15182553.6 dated Mar. 9, 2016, 6 pages.

(Continued)

*Primary Examiner* — Adam Lee
(74) *Attorney, Agent, or Firm* — Joseph R. Kelly; Kelly, Holt & Christenson PLLC

(57) ABSTRACT

Machine sensor inputs are received, and a set of performance metrics are calculated based upon the sensor inputs. The set of performance metrics are stored as a performance target along with one or more additional performance targets. One of the performance targets is retrieved and the machine automatically generates an action signal indicative of machine setting adjustments that can be made in order to control operation of the machine to more closely conform to the retrieved performance target.

18 Claims, 12 Drawing Sheets

(56) References Cited

U.S. PATENT DOCUMENTS

| | | | |
|---|---|---|---|
| 8,352,449 B1* | 1/2013 | Parekh | G06F 17/30864 |
| | | | 707/705 |
| 8,404,006 B2 | 3/2013 | Weigelt | |
| 8,700,263 B2 | 4/2014 | Matthews | |
| 8,935,060 B2 | 1/2015 | Baumgarten et al. | |
| 8,954,444 B1* | 2/2015 | Retzlaff, II | G06F 17/30613 |
| | | | 707/711 |
| 9,002,594 B2 | 4/2015 | Wilken et al. | |
| 2003/0042319 A1* | 3/2003 | Moore | G06F 17/30696 |
| | | | 235/494 |
| 2003/0066277 A1 | 4/2003 | Behnke | |
| 2004/0181515 A1* | 9/2004 | Ullmann | G06F 17/30884 |
| 2004/0215920 A1* | 10/2004 | Haas | G06F 17/30067 |
| | | | 711/216 |
| 2005/0041886 A1* | 2/2005 | Wada | G06F 17/30277 |
| | | | 382/305 |
| 2005/0216450 A1* | 9/2005 | Yokohari | G06F 17/30566 |
| 2006/0020402 A1 | 1/2006 | Bischoff | |
| 2007/0043790 A1* | 2/2007 | Kryger | G06F 11/1448 |
| 2007/0112841 A1* | 5/2007 | Iwayama | G06F 3/03545 |
| 2008/0294674 A1* | 11/2008 | Reztlaff, II | G06F 17/30613 |
| 2009/0000157 A1* | 1/2009 | Hartwick | B62D 11/001 |
| | | | 37/348 |
| 2009/0312079 A1 | 12/2009 | Good | |
| 2009/0312911 A1 | 12/2009 | Matthews | |
| 2009/0312920 A1* | 12/2009 | Boenig | A01D 41/127 |
| | | | 701/50 |
| 2010/0071329 A1 | 3/2010 | Hindryckx et al. | |
| 2010/0217481 A1 | 8/2010 | Baumgarten et al. | |
| 2011/0153586 A1* | 6/2011 | Wang | G06F 17/30545 |
| | | | 707/706 |
| 2011/0218999 A1* | 9/2011 | Kan | G06F 17/30306 |
| | | | 707/737 |
| 2012/0102903 A1 | 5/2012 | Weigelt | |
| 2012/0254194 A1* | 10/2012 | Wu | G06F 17/30884 |
| | | | 707/747 |
| 2013/0102369 A1 | 4/2013 | Johnson et al. | |
| 2013/0103260 A1 | 4/2013 | Matthews | |
| 2013/0232152 A1* | 9/2013 | Dhuse | G06F 17/30321 |
| | | | 707/741 |
| 2013/0304746 A1* | 11/2013 | Dhuse | G06F 11/1096 |
| | | | 707/743 |
| 2013/0317696 A1 | 11/2013 | Koch et al. | |
| 2013/0332003 A1 | 12/2013 | Murray et al. | |
| 2014/0019017 A1 | 1/2014 | Wilken et al. | |
| 2014/0019018 A1 | 1/2014 | Baumgarten et al. | |
| 2014/0169932 A1 | 6/2014 | Farley | |
| 2014/0236381 A1 | 8/2014 | Anderson et al. | |
| 2014/0379631 A1* | 12/2014 | Sebastian | G06F 17/30424 |
| | | | 707/607 |
| 2015/0006581 A1* | 1/2015 | Luo | G06F 21/6218 |
| | | | 707/783 |
| 2015/0088386 A1 | 3/2015 | Neu et al. | |
| 2015/0278966 A1* | 10/2015 | Johnson | G06Q 10/063 |
| | | | 702/2 |
| 2015/0293068 A1 | 10/2015 | Acheson et al. | |
| 2015/0293507 A1 | 10/2015 | Burns et al. | |
| 2016/0029559 A1 | 2/2016 | Inoue et al. | |
| 2016/0136671 A1* | 5/2016 | Kocer | A01C 23/007 |
| | | | 700/283 |

FOREIGN PATENT DOCUMENTS

| | | |
|---|---|---|
| DE | 102013106133 A1 | 6/2014 |
| EP | 2285643 B1 | 7/2015 |
| WO | 2010004383 A3 | 2/2010 |

OTHER PUBLICATIONS

U.S. Appl. No. 14/495,734, filed on Sep. 24, 2014, Prosecution History, 65 pages.

* cited by examiner

RECALLING CROP-SPECIFIC PERFORMANCE TARGETS FOR CONTROLLING A MOBILE MACHINE

RELATED APPLICATION

The present application makes reference to related application U.S. patent application Ser. No. 14/495,734, filed on Sep. 24, 2016, entitled "AUTOMATIC TUNING OF AN INTELLIGENT COMBINE", and assigned to the same assignee as the present application, and the content of which is fully incorporated herein by reference.

FIELD OF THE DISCLOSURE

The present disclosure relates to mobile equipment. More specifically, the present disclosure relates to recalling performance targets for use in controlling mobile machines.

BACKGROUND

There are a wide variety of different types of mobile machines, such as construction equipment, turf and forestry equipment, agricultural equipment, etc. They can be very complex and difficult to operate. For example, an operator of a combine may require years of experience and years of training before he or she can achieve relatively high performance in operating the combine.

While some pieces of mobile equipment have a variety of different sensors and control systems, they often rely on operator perception and manual control inputs. As part of such control systems, sensors provide sensor signals that are fed back to a main control computer. The main control computer can generate various displays that are indicative of the sensed variables.

When operating a mobile machine, such as a combine, an operator normally configures the machine according to a group of machine settings. For instance, the operator may configure the machine to have a certain fan speed, rotor clearance, sieve settings, chaffer openings, etc. Some systems also allow the operator to provide an input to save the machine settings for later analysis.

The discussion above is merely provided for general background information and is not intended to be used as an aid in determining the scope of the claimed subject matter.

SUMMARY

Machine sensor inputs are received, and a set of performance metrics are calculated based upon the sensor inputs. The set of performance metrics are stored as a performance target along with one or more additional performance targets. One of the performance targets is retrieved and the machine automatically generates an action signal indicative of machine setting adjustments that can be made in order to control operation of the machine to more closely conform to the retrieved performance target.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
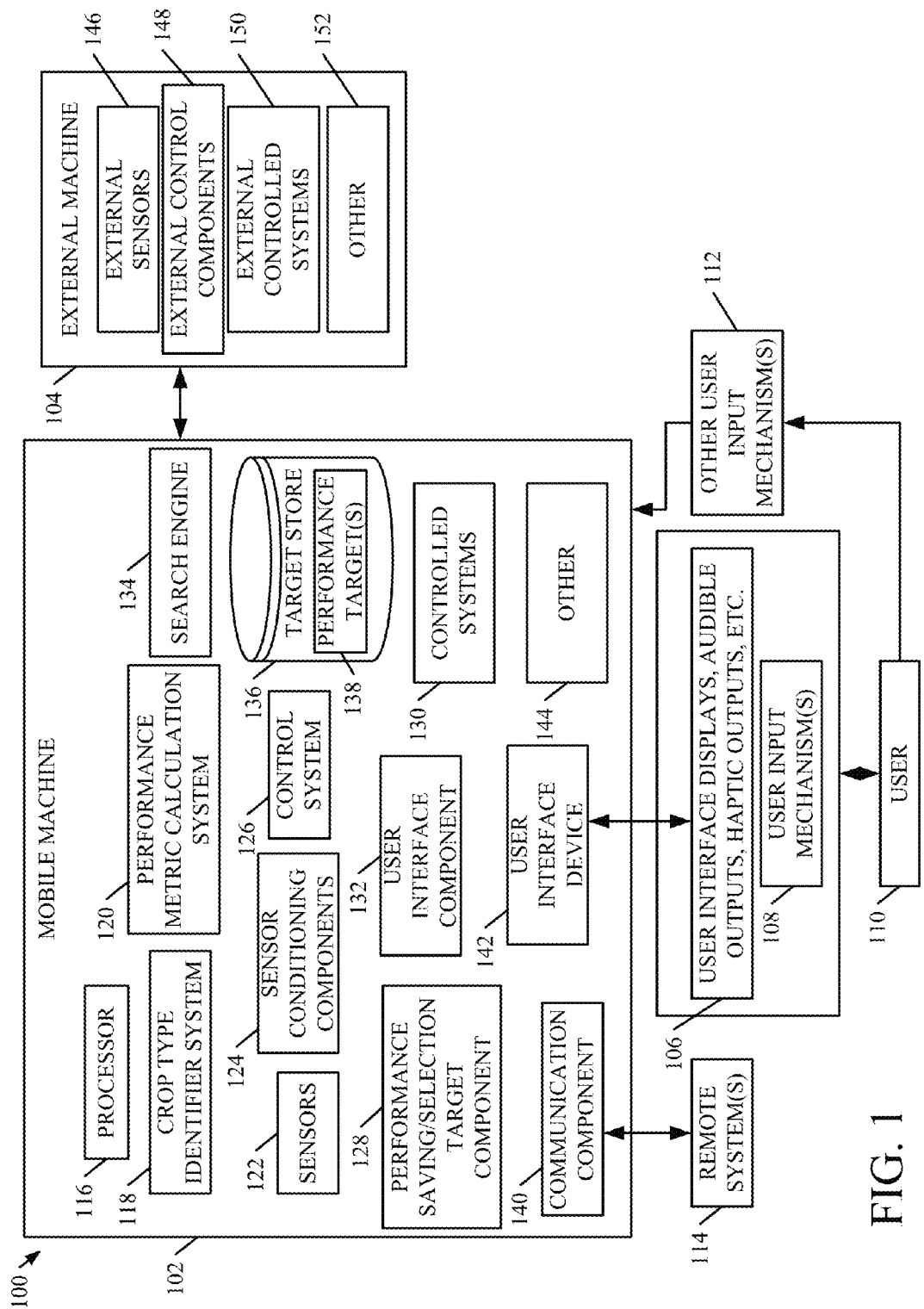
FIG. 1 is a block diagram of one example of a control system architecture that controls a mobile machine based on a performance target.

When operating a complex mobile machine, operating conditions can change fairly frequently. For instance, if a user is operating a combine on soybeans, the user may then switch to a field containing corn. The desired settings for the combine may vary significantly, based upon the crop type. Therefore, the machine settings for beans may be quite different from the machine settings for corn. In addition, the best settings for the machine may vary widely, based upon the condition of the given crop. For instance, where straight line winds have caused a large amount of crop to be down in a field, the operator may need to drive more slowly than if the crop is all standing. Similarly, wet grain can crack more easily than dry grain. Therefore, the settings can vary based upon the moisture content. In fact, even when there is a strong head wind, the machine settings may differ from when there is a strong tail wind. The same is true if the machine is going uphill or downhill. The best machine settings may vary based upon all these things, as well as a wide variety of other things.

As used herein, in one example, machine settings differ from performance metrics. In one example, machine settings are settings that are used to configure specific operations or characteristics of the machine. For instance, machine settings on a combine may be settings that set a particular fan speed, a rotor clearance, sieve settings, settings for the chaffer openings, engine speed, travel speed, etc. Machine performance metrics, on the other hand, are illustratively metrics that characterize the performance of the machine. For example, some machine performance metrics can be metrics indicative of productivity, power utilization, fuel economy (or fuel efficiency), material loss (e.g., grain loss), and material quality (e.g., grain quality—such as whether the grain is cracked, whether it includes material other than grain, etc.), among others.

The performance metrics can be calculated in a wide variety of different ways, and be represented in different units. For instance, grain productivity can be calculated in terms of volume per unit time (such as tons per hour). Power utilization can be calculated in terms of power efficiency (such as the amount of power utilized as a percent of the maximum rated power of the machine). Fuel economy can be calculated in terms of efficiency or otherwise, and can be represented in terms of unit volume of fuel per unit volume of crop harvest (such as liters per ton). Material loss levels can be calculated as a percent of the overall harvest, in terms of unit volume per acre harvested, loss as a percent of overall harvest, loss rate as compared to mass flow rate of grain being harvested or otherwise. The material quality metric can also be represented in terms of the percent of cracked grain or material other than grain that is included in the harvested crop. Of course, these are only examples of the different ways that performance metrics can be represented. Suffice it to say, for now, that performance metrics are different from machine settings, which, in an example, are settings that indicate how a machine is configured or characteristics of the machine or of its operation.

It may be that an operator, while operating a machine, may observe that the machine is operating at a particularly high performance level. The present discussion will proceed with respect to the mobile machine being a combine. In that case, the performance metrics for the machine, when it is performing well, can be calculated and saved as a performance target. When an operator is operating a similar machine under similar circumstances (such as for the same crop type, in a similar field, etc.) the operator can retrieve the previously-stored performance target and the corresponding target performance metrics can be used by the control system on the combine in an attempt to maintain performance metrics that are close to the target performance metrics. Further, in one example, the operator can choose from a plurality of different, previously-stored performance targets.

FIG. 1 is a block diagram of one example of a control system architecture 100. Architecture 100 illustratively includes mobile machine 102, and it can include an external machine 104. By way of example, mobile machine 102 may be an agricultural machine, such as a combine, and no external machine 104 is used. In another example, machine 102 is a tractor and external machine 104 may be an attachment, or another machine or implement that is towed behind the tractor. These are examples only. The mobile machine can be a wide variety of other machines as well, such as a forage harvester, a cotton harvester, a sprayer, a seeder, a sugarcane harvester, a piece of tillage equipment, other planting equipment, a piece of turf and forestry equipment, or construction equipment, among others.

FIG. 1 shows that mobile machine 102 illustratively generates user interface outputs, such as user interface displays 106 with user input mechanisms 108 that are provided for interaction by user (or operator) 110. As is described in greater detail below, the user interface displays can be displays that allow a user to store performance metrics and to retrieve previously-store performance metrics for use in controlling the mobile machine 102 or external machine 104, or both. FIG. 1 also shows that user 110 can provide inputs using other input mechanisms 112 as well. These can include a whole host of user input mechanisms that can be used to control machine 102 or machine 104, or both, such as switches, levers, pedals, etc. Further, FIG. 1 shows that mobile machine 102 can illustratively communicate with one or more remote systems 114. Remote systems 114 can include a wide variety of systems, and some examples of those are described below with respect to FIG. 2.

In the example shown in FIG. 1, mobile machine 102 illustratively (and by way of example only) includes processor 116, crop type identifier 118, performance metric calculation system 120, sensors 122, sensor conditioning components 124 and control system 126. It can also include performance target saving/selection component 128, controlled systems 130, user interface component 132, search engine 134, target store 136 (which illustratively stores performance targets 138), communication component 140, user interface device 142, and it can include a variety of other items 144 as well.

Before describing architecture 100, and its operation, in more detail, a brief overview of some of the components will first be provided. User interface component 132 can, either by itself or under the control of another item in machine 102, generate user interface displays 106 for display on display device 142. Sensors 122 sense a variety of variables and provide sensor signals to sensor conditioning components 124. Sensor conditioning components 124 can perform compensation, linearization, filtering, image processing, or a wide variety of other calibration and conditioning operations on the sensor signals. Control system 126 illustratively receives the sensor signals, after they are conditioned, and generates control signals to control various aspects of mobile machine 102, or external machine 104, or both, based upon the sensed variables. The control signals are provided to various controlled systems 130 that are controlled based upon the sensor signals. The controlled systems 130 can be electrical systems, mechanical systems, hydraulic systems, pneumatic systems, air-over-hydraulic systems, or other systems. The sensor signals and control signals can also be provided to performance metric calculation system 120 which can calculate a wide variety of a different types of performance metrics that can characterize the performance of mobile machine 102, or external machine 104, or both. Performance target saving/selection component 128 illustratively generates user interface displays 106 with user input mechanisms 108 that allow user 110 to save the calculated performance metrics as a performance target 138. The user 110 can save performance targets 138 in other ways as well. Any of the plurality of different performance targets 138 can be retrieved later and used by control system 126 to control mobile machine 102 (or external machine 104, or both) based upon the performance targets. It will be noted that, while target store 136 is shown as being local to mobile machine 102, it can be remote therefrom as well. For instance, it can be stored in a remote server location that is accessible by control system 126, or other components on mobile machine 102. It is shown as being stored locally for the sake of example only.

FIG. 1 shows that external machine 104 can also include a variety of different external sensors 146, external control components 148, external controlled systems 150, and it can include other items 152 as well. External sensors 146 illustratively sense variables and provide sensor signals (after they are conditioned) to external control components 148 and it can provide them to the items on machine 102 as well. Control components 148 generate control signals for controlling external controlled systems 150 on machine 104. In one example, the sensor signals and control signals can also be provided to performance metric calculation system 120 on machine 102, where they are used to calculate performance metrics that characterize the performance of external machine 104. Thus, they can be stored as a performance target for external machine 104, and they can be recalled and used to control machine 104 as well.

Figure 2:
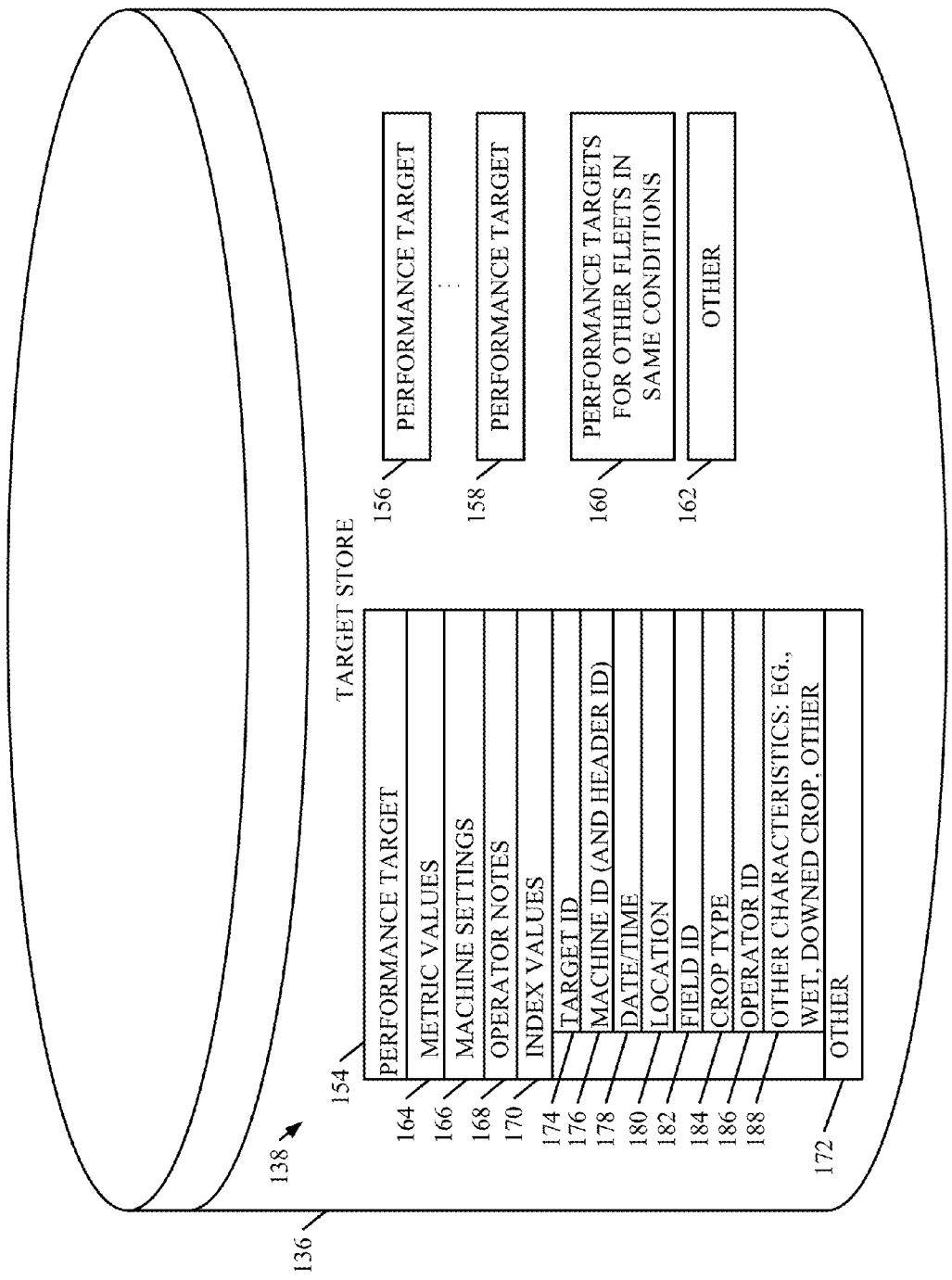
FIG. 2 is a block diagram of one example of a data store that stores performance targets.

FIG. 2 is a block diagram showing one example of target store 136 in more detail. It can be seen in FIG. 2 that target store 136 illustratively includes a set of performance targets 138. The individual performance targets in the set of performance targets 138 are illustratively represented by numbers 154, 156 and 158 in FIG. 2. FIG. 2 also shows that target store 136 can include performance targets from other fleets of machines, which may be located in a similar geographic region, or which may be operating under similar operating conditions, or which may be relevant to user 110 for other reasons. This is indicated by block 160. Target store 136 can include other items 162 as well.

In the example shown in FIG. 2, each performance target 154-158 illustratively includes a set of metric values 164. Each performance target 154-158 can also include machine settings 166 that were in place at the time that the metric values 164 were obtained. The performance targets can also include operator notes 168, a set of index values 170, and they can include other information 172. In the example shown in FIG. 2, the metric values 164 in performance target 154 can be indexed based on index values 170, so that they can later be retrieved by search engine 134.

The index values 170 can include a wide variety of different items. For instance, in the example shown in FIG. 2, the index values include a target identifier 174 that includes a unique identifier for this particular performance target 154. It can include a machine identifier 176 that identifies the particular machine 102 (and perhaps the external machine 104) that the performance target was generated on. For instance, where the machine 102 is a combine, the machine ID may include not only an identifier for that particular combine, but an identifier for the header that was used on the machine, when the performance target was generated. The index values 170 can also include a date and time 178 when the performance target was obtained, a location 180 (that can be provided by a geographic location generator, such as a GPS system), a field identifier 182 that identifies the particular field (and perhaps the farm) where the performance target was set, the crop type 184, the operator ID 186 and it can include a wide variety of other characteristics, such as whether the crop was wet, whether there was downed crop, whether there was a strong wind, the wind direction, etc. These items are indicated by block 188.

The performance targets can also have an expiration date or flag. This can indicate that the performance target has expired or been superseded by a newer performance target.

Figure 3:
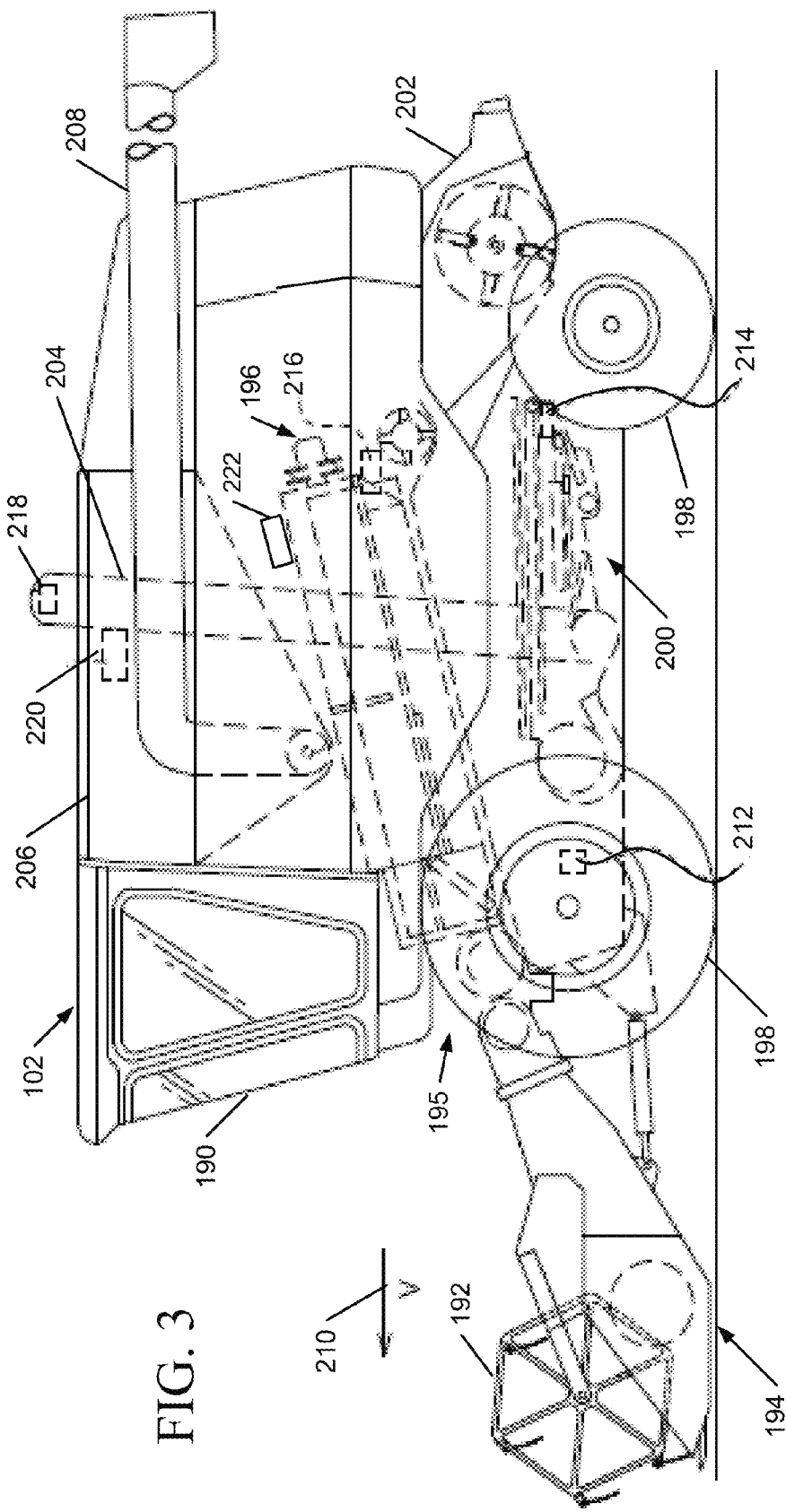
FIG. 3 is a pictorial illustration of one implementation of the control system architecture shown in FIG. 1, deployed on a combine.

FIG. 3 shows one pictorial illustration in which mobile machine 102 is a combine. It can be seen in FIG. 3 that combine 102 illustratively includes an operator compartment 190, a header 192, a cutter generally indicated at 194, a thresher generally indicated at 195, a set of ground engaging wheels 198, a separator 200, a spreader 202, an elevator 204, a clean grain tank 206 and a spout 208. In operation, combine 102 illustratively travels in the direction generally indicated by arrow 210. Header 192 engages the product being harvested and gathers it toward cutter 194. After it is cut, it is moved toward thresher 195 where it is threshed, and then moved to separator 196. The grain falls to cleaning shoe 200 and the clean grain is moved by elevator 204 into clean grain tank 206. Tailings can be passed back to thresher 195 where they are re-threshed. Material other than grain (such as stalks, husks, etc.) can be chopped and removed from machine 102 by spreader 202.

FIG. 3 also shows that, in one example, combine 102 includes a ground speed sensor 212, one or more cleaning shoe loss sensors 214, one or more separator loss sensors 216, a clean grain camera 220 and a tailings camera 222. Ground speed sensor 212 illustratively senses the travel speed of combine 102 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 214 illustratively provide an output signal indicative of the quantity of grain lost by both the right and left cleaning shoes. In one example, sensors 214 are strike sensors which count grain strikes per unit of time to provide an indication of the cleaning shoe grain loss.

Separator loss sensors 216 provide a signal indicative of grain loss in the left and right separators 196. This can be done by a wide variety of different types of sensors as well.

Yield monitor 218 is a sensor that senses yield. In one example, it can sense mass flow through elevator 204. It can provide an output signal indicative of this, to indicate the particular yield. This can be measured in bushels per hour, bushels per hectare, tons per hour or in other units.

Tailings camera 222 illustratively generates a video image of the tailings that are being passed back to the thresher for re-threshing. Clean grain camera 220 provides a video image indicative of the quality of the grain being deposited in clean grain tank 206.

Figure 4:
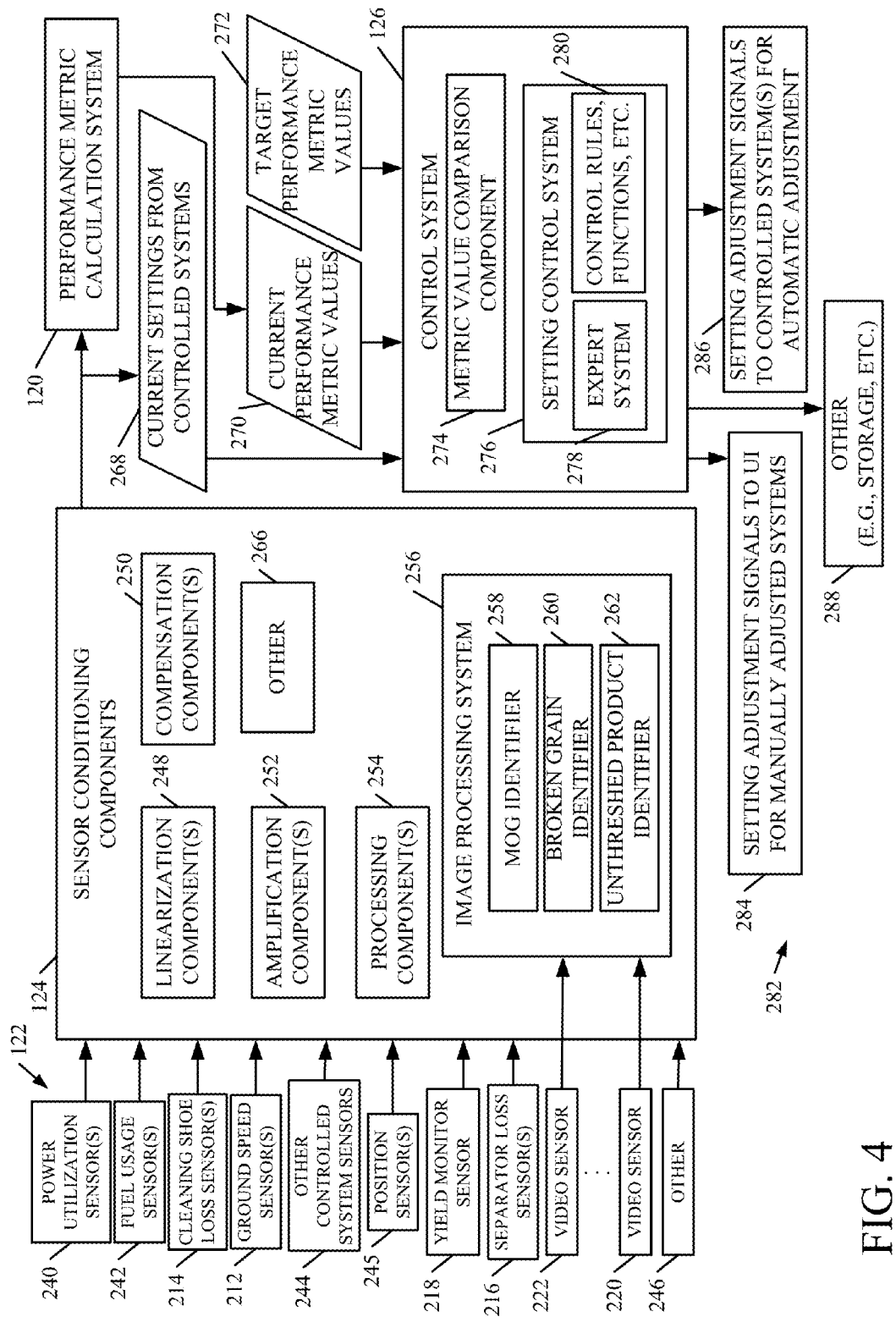
FIG. 4 is a more detailed block diagram of some of the items in the control system architecture shown in FIG. 1.

FIG. 4 is a block diagram of a portion of the control system architecture 100 shown in FIG. 1, but implemented using the components described with respect to combine 102, shown in FIG. 3. While architecture 100 can be disposed on any mobile machine, it is described in the context of a combine for the sake of example only.

FIG. 4 shows a number of the sensors 122 described above with respect to FIG. 3. FIG. 4 also shows that sensors 122 can include power utilization sensor 240, which can be configured to measure the power utilization of machine 102, as a percent of its rated power, or in other ways. Sensors 122 can also include fuel usage sensor 242 that senses fuel usage. Sensors 122 can also include other controlled system sensors 244 that sense a variety of other things in the controlled systems 130. For instance, they can sense fan speeds, rotor speeds, pressures, flow rates, positions of items, and a wide variety of other things. Sensors 122 can include position sensor 245. Of course, sensors 122 can include a variety of other sensors 246 as well.

FIG. 4 also shows that sensor conditioning components 124 can include linearization components 248 that perform linearization on the various signals received. They can also include compensation components 250 that compensate for a variety of influences (such as temperature, etc.) on the sensor signals. Further, they can include amplification components 252 that amplify the sensor signals so that they are in a desired range. They can include a wide variety of processing components 254 that perform additional processing on the sensor signals in order to derive various values. For instance, processing components 254 can receive the power utilization sensor signal from sensor 240 which indicate the current power utilization of machine 102. Processing components 254 can perform the necessary processing to convert that signal into a value that indicates the percent of rated power that is being used. Processing components 254 can perform a wide variety of other processing as well, such as averaging, time rolling calculations, other aggregation calculations, mean calculations, value distribution calculations, and a wide variety of other processing.

FIG. 4 also shows that signal conditioning components 124 can include image processing system 256 which, itself, includes a material other than grain (MOG) identifier 258, broken grain identifier 260, and unthreshed product identifier 262, among other things. Image processing system 256 illustratively receives the video signals from video sensors (e.g., cameras) 220 and 222 and processes them to generate output signals indicative of various parameters or performance metrics. Based upon the video signal from camera 220, which is positioned in clean grain tank 206, MOG identifier 258 can generate an output signal indicative of a quantity (or percent or other measure) of material other than grain (such as cobs, husks, stalks, chaff, etc.) that is entering clean grain tank 206. Broken grain identifier 260 can process the video signal from camera 220 to identify a quantity (or percent or other measure) of broken grain entering clean grain tank 206. Unthreshed product identifier 262 can receive the video signal from tailings camera 222 and generate an output signal indicative of a quantity (or a percent or other measure) of unthreshed product that is being sent by the tailings elevator back to the thresher, for rethreshing.

FIG. 4 also shows that sensor conditioning components 124 can include a wide variety of other components as well. This is indicated by number 266 in FIG. 4.

The output from sensor conditioning components 124 is illustratively provided to performance metric calculation system 120 for the calculation of the performance metrics. In one example, some of the sensors 122 provide signals that are indicative of the current machine settings on machine 102, for the various controlled systems 130 on machine 102. Therefore, those values (as indicated by block 268) can also be provided to control system 126 for use in controlling machine 102. This is described in greater detail below.

Performance metric calculation system 120 then calculates current values for the performance metrics. These values indicate a current performance of machine 102. The current performance metric values are indicated by block 270 in FIG. 4. In one example, as is discussed in greater detail below with respect to FIG. 5, control system 126 obtains target performance metric values indicative of the performance targets that the user wishes to attain while operating machine 102. Those target performance metric values are indicated by block 272, and they can be obtained from target store 136, for instance.

FIG. 4 shows that control system 126 can include metric value comparison component 274 and setting control system 276. Setting control system 276 can include an expert system 278 that accesses control rules, functions, etc. 280, to generate a set of output signals 282. Expert system 278 can also be a neural network, a fuzzy logic system, a machine learning system, or a variety of other types of systems.

In one example, for instance, metric value comparison component 274 compares the current performance metric values 270 against the target performance metric values 272 and generates a difference signal indicative of the difference between those two sets of values. Expert system 278 then accesses control rules, functions, etc. 280 to identify various actions that can be taken in order to adjust the operation of machine 102 (or its configuration settings, etc.) so that its performance (indicated by the current performance metric values 270) more closely matches the desired performance (indicated by the target performance metric values 272). Setting control system 276 can access the current settings or operating conditions 268 from the controlled systems and output signals indicative of how those settings or other operating conditions should be adjusted.

The output signals 282 can include setting adjustment signals that are sent to a user interface display, or another user interface device, to indicate to user 110 which particular adjustments should be made. Those adjustments can then be made manually by user 110. This is indicated by block 284. The output signals from control system 126 can also include setting adjustment signals that are provided directly to the controlled systems 130 to automatically adjust the settings of the controlled systems. These signals are indicated by block 286. The signals can also be output in other ways, such as for storage (for later analysis), or for other uses. This is indicated by block 288.

Figure 5A:
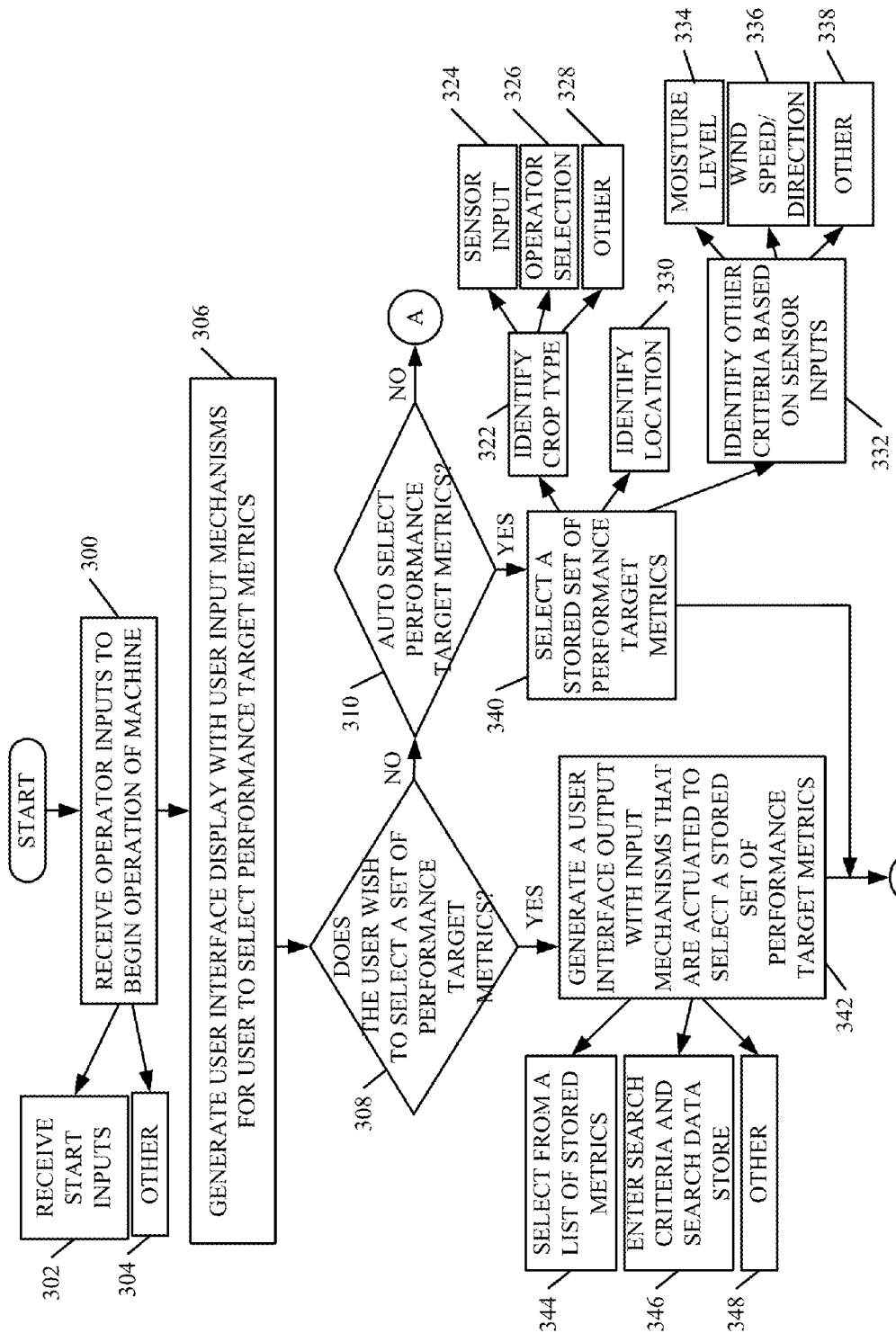
FIGS. 5A and 5B (collectively referred to as FIG. 5) illustrate one example of the operation of the control system architecture shown in the previous Figures in controlling a mobile machine based upon a performance target.
Figure 5B:
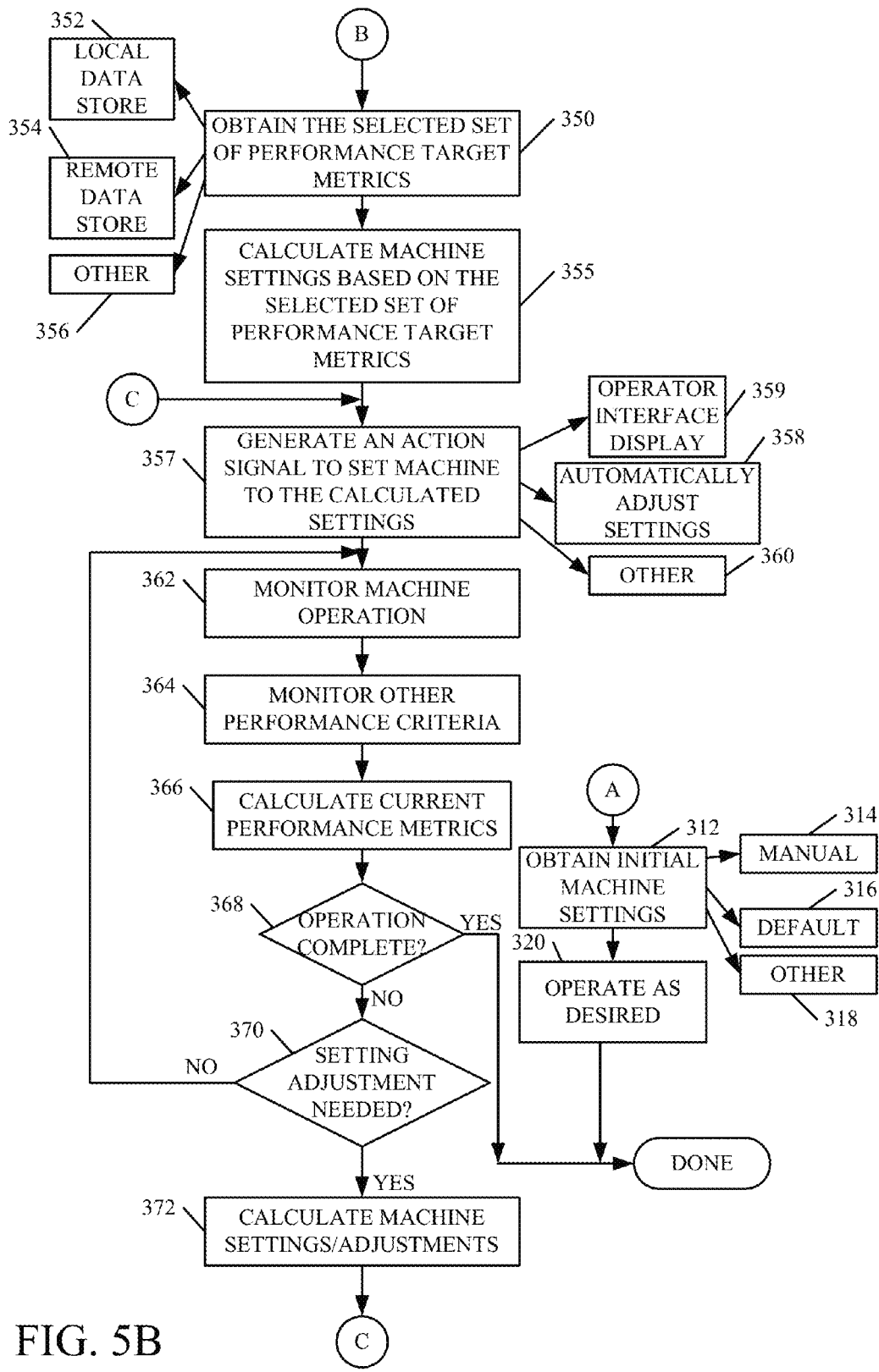

FIGS. 5A and 5B (collectively referred to as FIG. 5) show a flow diagram illustrating one example of the operation of architecture 100 in comparing the current performance of machine 102 against the target performance and outputting control signals to adjust the control of machine 102 based upon that comparison. FIG. 5 assumes that a plurality of different relevant performance targets 138 have already been stored in target store 136, and that they are accessible by control system 126 on machine 102.

User 110 provides inputs through the various user input mechanisms on machine 102 to begin operation of the machine 102. This is indicated by block 300 in FIG. 5. For instance, the user can provide a start input (or ignition input) to start the machine 102, and then begin its operation. This is indicated by block 302. User 110 can provide other inputs as well, and this is indicated by block 304.

Performance target saving/selection component 128 then generates a user interface display with user input mechanisms for user 110, giving user 110 a number of options. For instance, user 110 can select a performance target (including a set of performance target metrics), from a plurality of different, saved performance targets, for machine 102. Another option is for the user to have component 128 automatically select a performance target. Yet another option is to bypass the performance target entirely. Displaying the user interfaces that give the user these options is indicated by block 306.

It may be that the user does not wish to select a set of performance target metrics, at this point. In that case, the user provides a suitable user input indicating this. This is indicated by block 308. In another example, the user can indicate that he or she wishes performance target saving/selection component 128 to automatically select a set of performance target metrics (e.g., a performance target) from the plurality of saved performance targets, for use in controlling machine 102. This is indicated by block 310. If the user does not wish to do this either, then machine 102 simply obtains the initial machine settings, as indicated by block 312, and no performance target is used. The user can provide the initial settings manually as indicated by block 314, or they can be set to default values 316 by the machine, itself. The initial machine settings can be obtained in other ways as well, and this is indicated by block 318. User 110 then operates machine 102, as desired, without using a performance target. This is indicated by block 320.

Returning again to block 310, assume that the user provides an input indicating that the user wishes the performance target saving/selection component 128 to automatically select a set of performance target metrics (e.g., a performance target) from the plurality of saved performance targets. In this case, system 128 selects a stored set of performance target metrics, from a plurality of sets of performance target metrics, for use in controlling machine 102. This is indicated by block 340 in FIG. 5. The performance target metrics 164 in the selected performance target are used to control machine 102, as described below. Before describing that, however, a number of examples of how system 128 automatically selects the set of performance target metrics will first be described.

In one example, component 128 uses crop type identifier system 118 to automatically identify the crop type, with which machine 102 is being used. This is indicated by block 322. This can be obtained using a sensor input 324. For instance, machine 102 can have a camera that is mounted to generate a video image indicative of the crop being harvested. The image processing system 256 can process this image to identify the type of crop that is being harvested (such as corn, beans, oats, canola, etc.). In another example, the user provides an input selecting a crop type. This is indicated by block 326. Crop type identifier system 118 can identify the crop type in other ways as well, and this is indicated by block 328.

Component 128 can obtain other information (in addition to, or instead of, the crop type) that may be helpful in automatically selecting a set of performance target metrics to be used in controlling machine 102 from a GPS or other positioning system on machine 102. For instance, component 128 can obtain a current location of machine 102. This is indicated by block 330. This can be used, for instance, in a case where performance targets are stored in target store 136 and are indexed by field location or by farm. In that case, component 128 can identify the best performance target that was generated in that field, and/or for this crop type. This is an example only.

System 128 can also identify other criteria, based on sensor inputs, that can be used to automatically select a set of target performance metrics (e.g., a given performance target). This is indicated by block 332. For instance, component 128 may obtain a moisture level for the crop, as indicated by block 334. It may obtain a sensor input indicative of wind speed and direction as indicated by block 336. It can obtain a whole host of other information 338 as well, such as the machine and header ID, operator ID, weather conditions, etc. Component 128 can use this to search for a most relevant performance target in target store 136. By way of example, if a performance target was stored for the same field in the previous year, and the wind speed and the moisture level were approximately the same as current conditions, then that performance target may have the best set of performance target metrics that system 128 can locate. System 128 can search for a performance target in other ways as well, and using other criteria.

Returning again to block 308, assume now that the user has provided an input indicating that the user wishes to select a performance target for use in controlling machine 102, instead of having component 128 automatically select it. In that case, performance target saving/selection component 128 generates a user interface display with input mechanisms that are actuated to select a stored performance target, from the plurality of different performance targets. This is indicated by block 342. For instance, system 128 can gather relevant information and automatically identify the top N performance targets in target store 126 based upon how they relate to the gathered information. System 128 can, for example, use search engine 134 to find all performance targets for the present machine, with the present header, and having the same crop type. System 128 can then display all of the performance targets that meet those criteria. The user can then select from this list of stored performance targets that is automatically generated by system 128. This is indicated by block 344.

In another example, system 128 generates a user interface display with a search box (or with another search criteria input mechanism) that allows the user to input or select a set of search criteria to be used in searching data store 136 for relevant sets of performance targets. The user can then input (such as type in or select) keywords or other search criteria. Search engine 134 then searches target store 136 for the most closely matching performance targets 138. By way of example, assume that the user is operating in a wet field with downed crop. Assume that the user also recalls recently operating in a different wet field with downed crop, where the user achieved desirable performance and stored the performance metrics 166 as a performance target 138 in data store 136. In that case, user 110 can enter search criteria (such as a date range, crop type and condition identifier identifying wet conditions with downed crop, etc.) through the search interface so that search engine 134 can surface the previously stored performance targets for use by user 110 in harvesting the current field. Entering search criteria and searching data store 136 is indicated by block 346 in FIG. 5.

The user can select one of the plurality of stored performance targets in other ways as well. This is indicated by block 348.

Once a performance target has been identified (either manually or automatically), control system 126 obtains the selected set of performance target metrics 166 for the selected performance target from data store 136. This is indicated by block 350 in FIG. 5. Where data store 136 is a local data store 352, control system 126 obtains those target metrics locally. Where it is a remote data store 354, control system 126 illustratively uses communication component 140 to download the selected set of performance target metrics from a remote system 114. Control system 126 can obtain the set of selected target metrics in other ways as well, and this is indicated by block 356.

Setting control system 276 then calculates machine settings based upon the obtained set of performance target metrics. This is indicated by block 355. For instance, setting control system 276 can calculate machine settings for all configurable controlled systems on machine 102. By way of example, system 276 can calculate settings for various pressures, fan speeds, rotor clearance, sieve and chaffer openings, among a wide variety of other settings. It can also calculate operator controllable settings, such as engine speed settings, ground speed settings, etc.

Setting control system 276 then generates an action signal to set the machine to the calculated settings. This is indicated by block 357. For instance, the action signal can be a signal 284 which generates an operator interface display 359 that identifies, to the operator, how the settings should be manually set. It can also generate an output signal 286 that is used to automatically adjust the settings or configurations of machine 102. This is indicated by block 358. It can generate the action signal in other ways as well, and this is indicated by block 360.

The various sensors 122 then monitor machine operations and generate various other performance criteria based upon the operation of machine 102. This is indicated by blocks 362 and 364 in FIG. 5. Performance metric calculation system 120 calculates the current performance metric values for the various performance metrics, for machine 102, as it is being operated. This is indicated by block 366.

At any time, if the operation is complete, then machine 102 can cease calculating these items. This is indicated by block 368.

However, if machine 102 is still being operated, then setting control system 276 illustratively determines whether the settings need to be adjusted in order for the calculated current performance metric values to more closely match the performance target metric values. This is indicated by block 370 in FIG. 5.

Control system 126 can determine whether setting adjustments need to be made in a variety of different ways. For instance, each target metric value can have an associated performance window. If the current metric value deviates from the target performance metric value outside of that window, then this may indicate that a setting adjustment needs to be made. This operates as a type of thresholding so that the various performance metric values can deviate somewhat from the target values without having system 276 continuously making changes and adjustments to the machine settings. This is only one example of how system 126 can determine whether the setting adjustments need to be made.

In deciding which particular machine settings need to be adjusted (or in calculating the actual adjustments that need to be made) system 276 can operate in a variety of different ways. For instance, the rules or functions 280 can act as a mapping between deviations from certain target performance metric values and the particular settings that need to be adjusted. The rules or functions can consider that certain settings may improve one performance metric while degrading another. By way of example, increasing power utilization may improve the power utilization performance metric, but it may also decrease fuel efficiency, under certain circumstances. Therefore, the rules and functions illustratively accommodate for these off-setting adjustments to generate machine setting adjustments that will cause the current performance metric values to more closely conform to the performance target values, as a whole.

In another example, some performance metric values may be more important than others. In that case, the expert system can weight those performance metric values more heavily in its calculation of whether and what machine settings need to be adjusted. All of these are examples only, and other examples of deciding whether and what machine setting adjustments need to be made, can be used.

If, at block 370, it is determined that no adjustments need to be made, processing reverts to block 362 where monitoring is continued and the current performance metric values are calculated. However, if, at block 370, it is determined that an adjustment is needed, then setting control system 276 illustratively calculates the machine settings or adjustments that need to be made. This is indicated by block 372. Processing then reverts to block 354 where system 276 generates an action signal to either instruct the operator to manually make the setting adjustments, or to automatically make the setting adjustments, or both.

Figure 6:
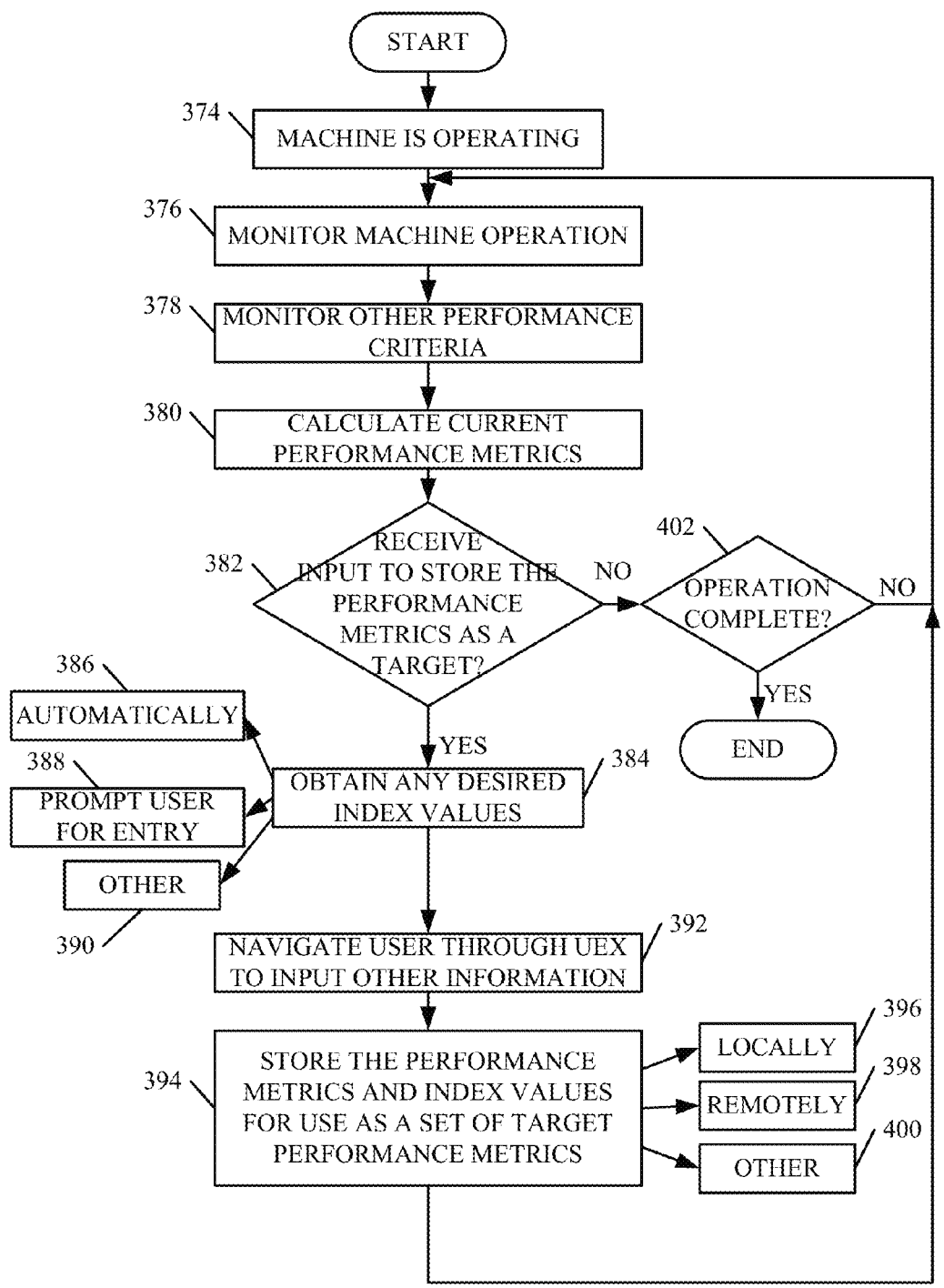
FIG. 6 is a flow diagram illustrating one example of the operation of the control system architecture shown in previous Figures in generating and storing a performance target for later use.

FIG. 6 is a flow diagram illustrating one example of the operation of architecture 100 in allowing user 110 to store a set of performance metric values as a performance target 138. The flow diagram of FIG. 6 assumes that the machine is operating. This is indicated by block 374 in FIG. 6. In addition, the various sensors 122 are monitoring machine operation and various other performance criteria that are used in calculating the performance metric values. This is indicated by blocks 376 and 378 in FIG. 6. Performance metric calculation system 120 is intermittently, or continuously, calculating current performance metric values based upon the sensors and other monitor signals. This is indicated by block 380.

User 110 is illustratively observing and visually monitoring the operation of machine 102 to determine whether its performance is adequate. If not, user 102 can make various setting adjustments or other operational adjustments to increase the performance of machine 102. At some point, it is assumed that user 110 observes that the operation of machine 102 is sufficient to represent a performance target. For instance, user 110 can observe that machine 102 is performing at a very high level. In that case, user 110 illustratively provides an input through a suitable user input mechanism that indicates that performance target saving/selection component 128 is to store the current performance metric values as a performance target 136. Receiving the input to store the performance target metric values as a performance target is indicated by block 382.

When this happens, performance target saving/selection component 128 illustratively obtains the desired index values that are to be stored along with the performance target 138. This is indicated by block 384. Some or all of these values can be obtained by system 128 automatically. This is indicated by block 386. For instance, the system may be able to automatically assign a target identifier to this particular performance target and identify the machine ID and header ID, the date and time, the location, the field ID, the crop type, the operator ID, and other index values.

In another example, system 128 can prompt user 110 for entry of the index values, or for those values that were not obtained automatically. Prompting the user is indicated by block 388. Component 128 can obtain the index values in other ways as well, and this is indicated by block 390.

Component 128 can then navigate the user through a user experience that allows the user to input other information. This is indicated by block 392. For instance, component 128 can generate a user interface display with user input mechanisms that allow user 110 to input other information, such as notes, crop conditions, weather conditions, or other information that may be useful to this user 110, or a different user 110, in the future.

Once all the information is input for the performance target, the performance metrics and index values are all stored for use as a performance target (e.g., set of target performance metrics) 138. This is indicated by block 394 in FIG. 6. As mentioned above, they can be stored on a local data store, as indicated by block 396. They can be stored remotely as indicated by block 398, or they can be stored in other locations 400. Processing then reverts back to block 376 where the various sensors continue to monitor the operation and performance criteria of machine 102.

At some point, the operation is complete. This is indicated by block 402 in FIG. 6.

Thus, the present discussion describes that a user can select from a plurality of different, previously-stored performance targets. They can be indexed in a wide variety of ways and selected manually or automatically.

It should be noted that, while the above discussion has proceeded with machine 102 being a combine, it could just as easily be a variety of other machines as well. Some of these were mentioned above. Of course, these are examples only.

It should also be noted that the system illustratively stores, as performance targets, performance metric values and not simply machine settings. Thus, the system controls machine 102 based on its performance, and not simply based upon its settings. This accommodates for a wide variety of different types of scenarios, but still keeps machine 102 performing well.

By way of example, to some extent, the machine settings are not of primary importance, as long as the machine is performing well. Some machines, for instance, have tolerances for the various weldments that form the machine. Therefore, if one machine has a certain machine configuration setting that is set to 5 mm, and a second machine is set to the same setting, the two machines may operate entirely differently, because the weldments on the first machine do not precisely match those on the second machine (although they may be within the acceptable tolerances). Therefore, assume that a user was operating the first machine and obtained a high level of performance. If only the machine settings were stored from the first machine, then those machine settings would be inappropriate for operation of a second machine. If they were downloaded as machine setting targets for the second machine, and the second machine was configured using those settings, the performance would be entirely inadequate, because of even slight differences in the machines' weldments.

However, as described above, once the user has obtained desired performance using the first machine, it is the performance metrics that are saved. Therefore, when those performance metrics are downloaded to the second machine (as a performance target), the control system automatically sets the machine settings, and makes adjustments to them, to obtain the performance that was previously obtained using the first machine. The same can be done where the machine is the same but some other criteria are different. For instance, it may be the same machine operating in a different crop type, or on different land, or with a different header, etc. In the end, the operator does not care whether a given machine setting was set to 5 mm or 10 mm as long as the machine is performing well. Thus, while the control system may consider the previous machine settings as initial settings, the control system may also ignore the previous machine settings, and may use the expert system to derive an initial set of machine settings and then intermittently adjust those settings to maintain the performance of the machine within the performance window of the target set of performance metrics. This same system can be applied across multiple different types of machines.

For example, where the system is used on a sprayer that is spraying a liquid product on a field, it may be that an important performance metric is application rate (such as liters per acre). In that case, the control system is not so much interested in the hose diameter for the sprayer, as it is in the application rate. Thus, the control system can control the valve settings, the pump displacement, the flow rate, etc., in order to achieve the desired performance, regardless of the particular machine settings that were used on the machine that generated the performance target metric values.

Similarly, where the present system is deployed on a seeder, the performance metric value of interest may be population in terms of seed spacing, number of plants per acre, etc. In that case, the control system does not so much care about the air pressure in the seed delivery tubes as it does about the population performance metric value. Thus, as long as the control system is controlling the machine to the performance target metric value, and not the machine settings, the same performance can be achieved across different machines, across time periods, from year-to-year, etc.

In addition, the present system accommodates for a scenario in which environmental conditions exist that the machine does not necessarily know about. For instance, assume that the machine is harvesting wheat. It may be that there has been recent rain, so the crop is wet. In that case, the operator 110 may have operated in wet conditions just recently in a different field, or even last year in the same field. Thus, operator 110 can use the system to identify the performance target metric values that were stored for that field, under similar conditions, and download them to the control system to be used as a performance target. The performance target can be used in controlling the operation of machine 102 in the current field, under the current conditions.

Similarly, the performance target metric values can be used by relatively inexperienced operators to obtain higher performance. By way of example, assume that a highly experienced operator is harvesting beans and achieves a high level of machine performance. The experienced operator can store those performance metric values as a performance target to a remote data store where they can be accessed by other users. In that scenario, less experienced users can download the performance target, for the same crop type, so that the control system can control the machine of the inexperienced operator in order to achieve a high level of performance. Thus, the expert operator need not be in the machine in order to obtain a higher level of performance.

In yet another scenario, an operator may be harvesting beans in one field and have the machine set up so that it is achieving a very high level of performance. The user can then store the performance metric values as a performance target. However, it may be that the user then needs to switch fields to harvest corn. In that case, the machine settings must normally be changed to achieve a high level of performance in harvesting corn. It may be that, even later in the same day or same week, the user reenters a bean field to again harvest beans. The user can then simply recall the performance target that was achieved in the first bean field and the control system will automatically control the machine to obtain those performance target metric values. In this way, the user need not attempt to recreate the precise settings that were used to obtain the high level of performance, as the control system can do this automatically. Therefore, as the operator moves from field to field and/or from crop type to crop type, he or she can recall the previously known performance targets for that crop type and/or for that field.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interfaces have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands. The user interfaces can be natural user interfaces, audible or haptic interfaces, etc. The user input mechanisms can include, levers, switches, pedals, steering wheels, etc.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
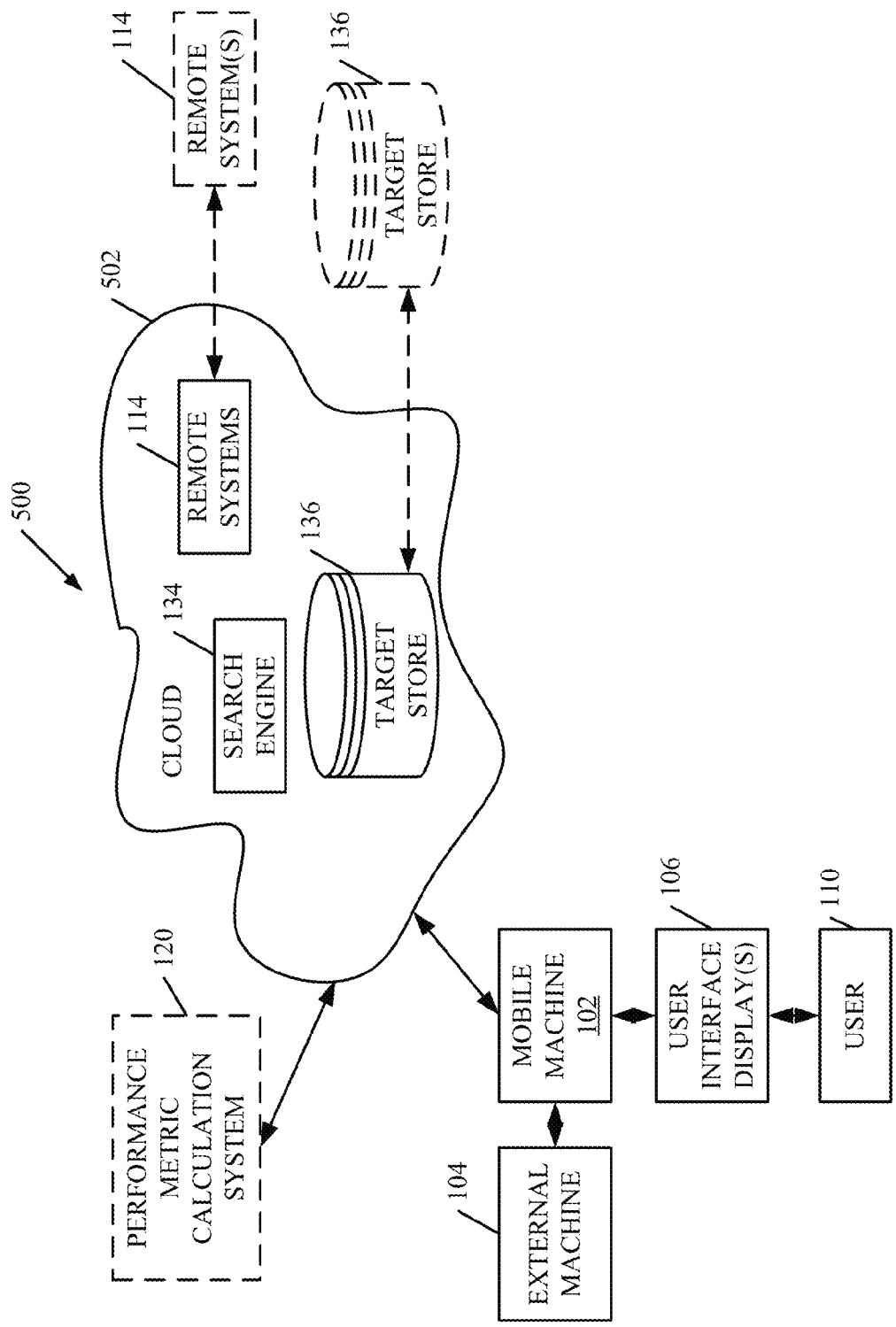
FIG. 7 shows one example of a remote server environment.

FIG. 7 is a block diagram of architecture 100, shown in FIG. 1, except that it communicates with elements in a remote server architecture 500. In an example embodiment, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the embodiment shown in FIG. 7, some items are similar to those shown in FIG. 1 and they are similarly numbered. FIG. 7 specifically shows that target store 136, search engine 134 and remote systems 114 (or any other parts of the control architecture 100) can be located at a remote server location 502. Therefore, machine 102 accesses those systems through remote server location 502.

FIG. 7 also depicts another embodiment of a remote server architecture. FIG. 7 shows that it is also contemplated that some elements of FIG. 1 are disposed at remote server location 502 while others are not. By way of example, target store 136 or remote systems 114 can be disposed at a location separate from location 502, and accessed through the remote server at location 502. Regardless of where they are located, they can be accessed directly by machine 102, through a network (either a wide area network or a local area network), through a mobile device used by user 110 on machine 102, they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the machine 102 comes close to the fuel truck for fueling, the system automatically collects the information (e.g., performance target) from the machine 102 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine 102 until the machine 102 enters a covered location. The machine 102, itself, can then send the information to the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
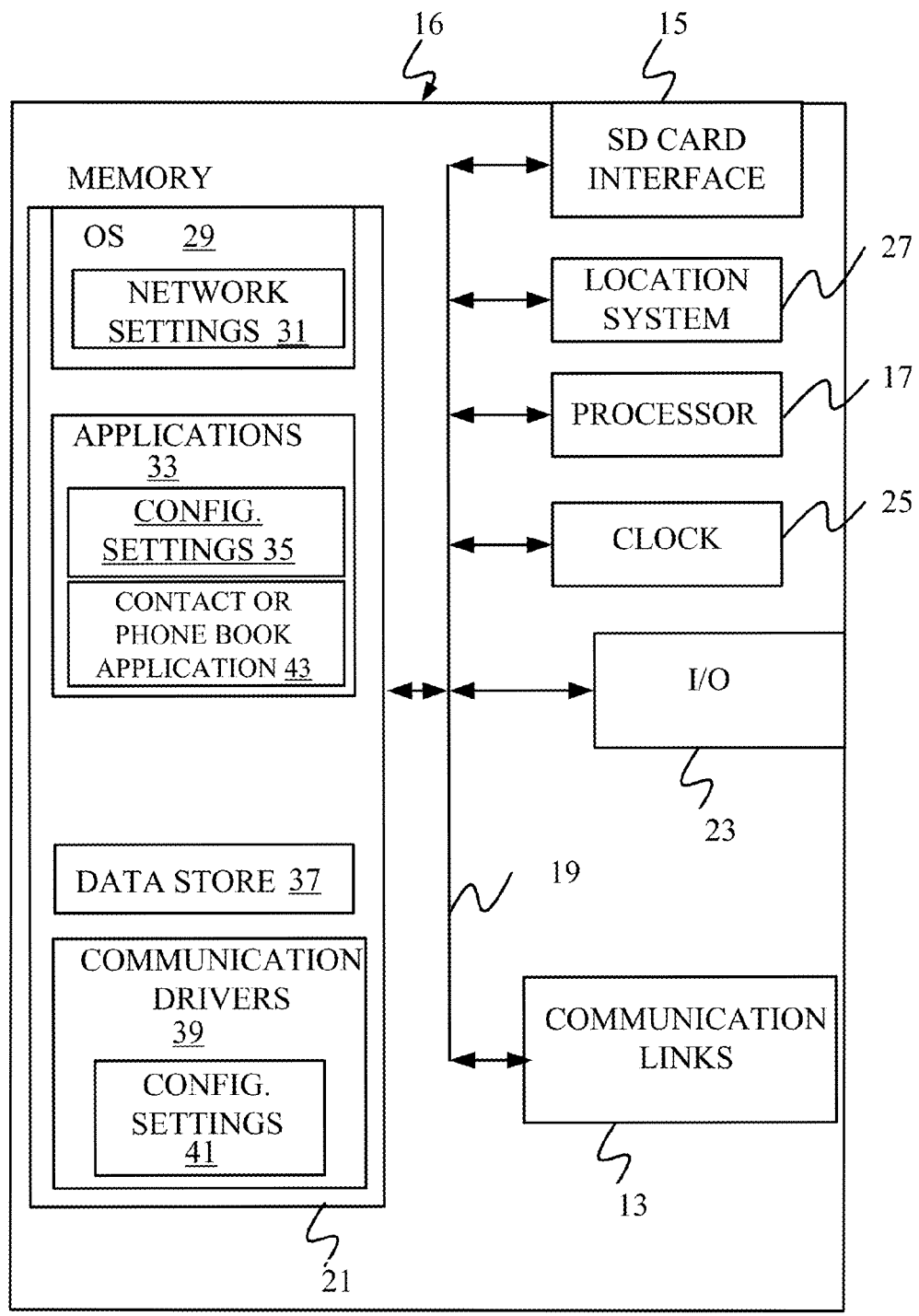
FIGS. 8-10 show mobile devices.
Figure 9:
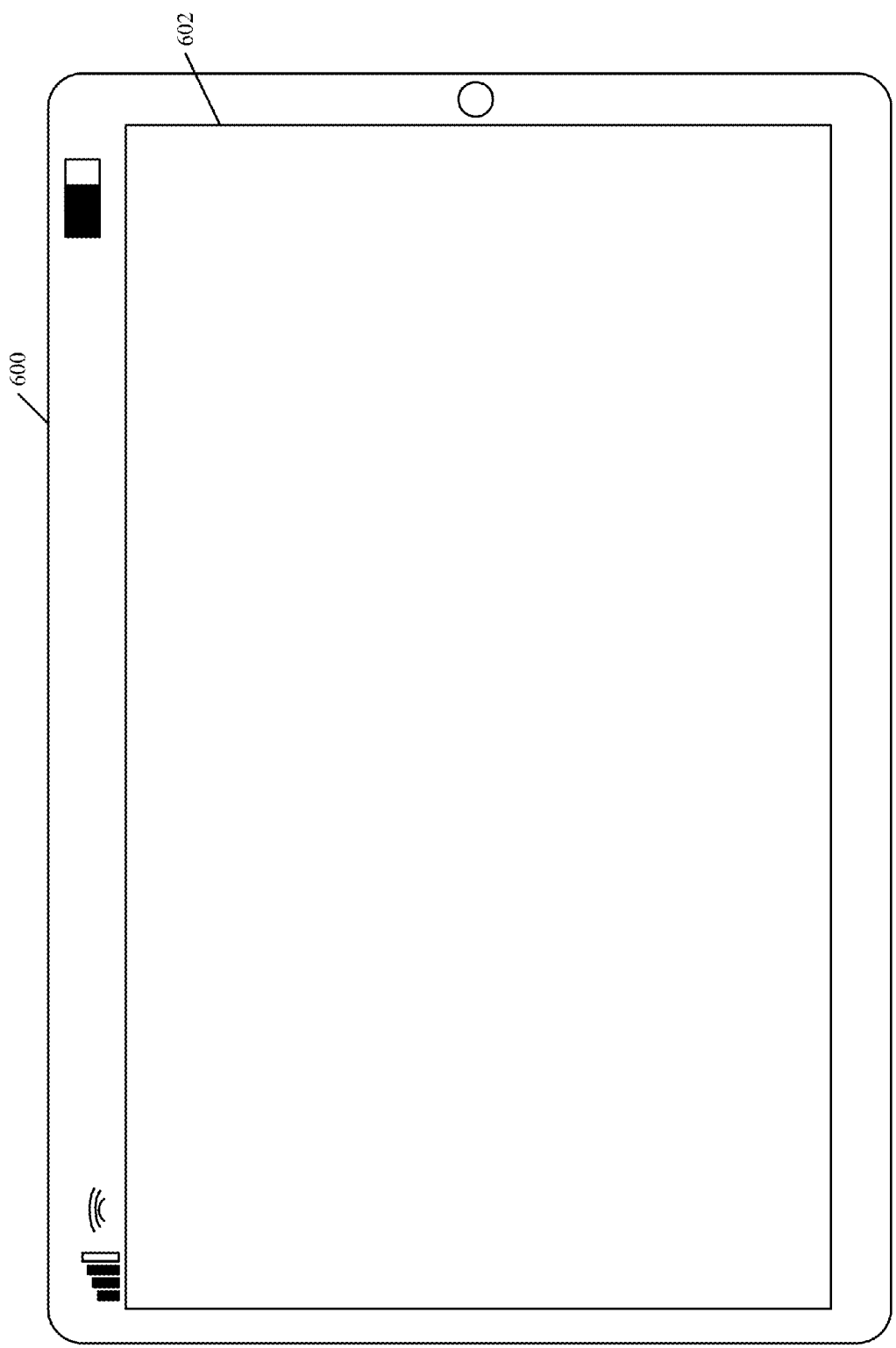
Figure 10:
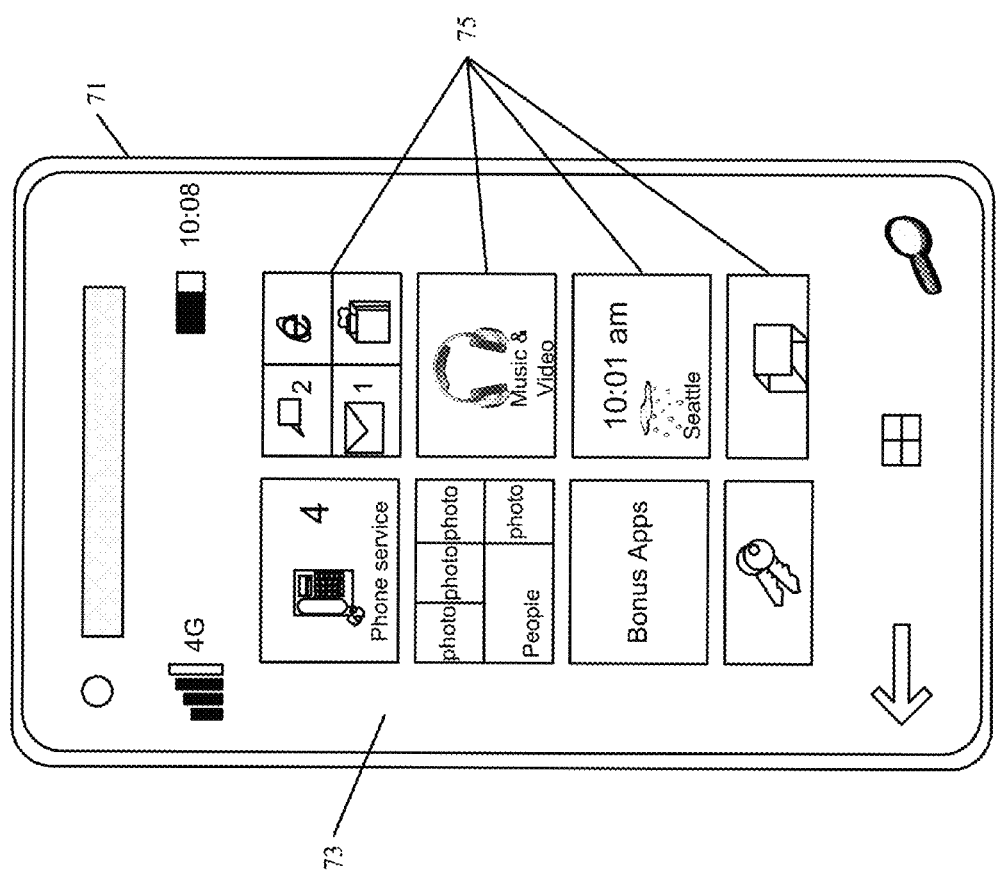

FIG. 8 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of machine 102 for use in generating, processing, or displaying performance targets. FIGS. 9-10 are examples of handheld or mobile devices.

FIG. 8 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other example, applications can be received on a removable Secure Digital (SD) card that is connected to an interface 15. Interface 15 and communication links 13 communicate with a processor 17 (which can also embody processor 116 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 600. In FIG. 9, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional example of devices 16 can be used as well. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals. In some examples, the phone also includes a Secure Digital (SD) card slot that accepts a SD card.

FIG. 10 shows that device 16 can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
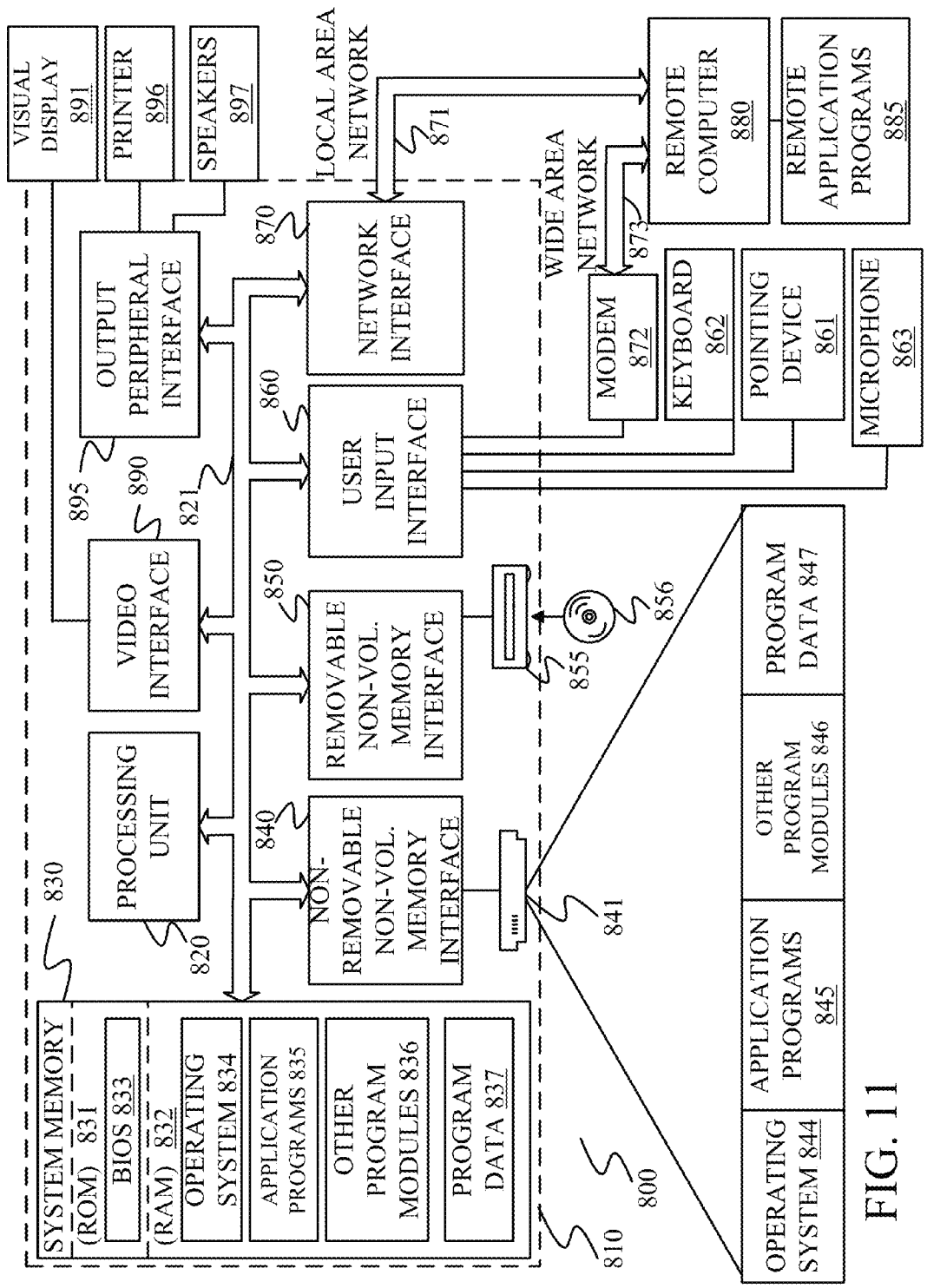
FIG. 11 is a block diagram of a computing environment.

FIG. 11 is one embodiment of a computing environment in which elements of FIG. 1, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise processor 116), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A mobile machine operating on a crop of a crop type, comprising:
 a set of controlled systems that control operation of the mobile machine based on settings of the mobile machine;
 a performance metric calculation system that receives a sensor signal and calculates a current performance metric value indicative of a current performance level of the mobile machine based on the received sensor signal; and
 a control system that
  obtains a given performance target from a plurality of different, previously-stored, performance targets based on the crop type, wherein the given performance target is indicative of a target performance level of the mobile machine, and wherein the performance targets are based on data obtained from one or more other mobile machines operating on a crop of a same crop type as the mobile machine, and
  generates a control signal for the set of controlled systems, indicative of adjustments to the settings of the mobile machine, based on the current performance metric value and a performance target metric value in the given performance target, wherein the control system controls the set of controlled systems using the generated control signal.

2. The mobile machine of claim 1 and further comprising: a plurality of different sensors generating sensor signals indicative of operating characteristics of the mobile machine.

3. The mobile machine of claim 2 and further comprising: a performance target selection component that selects the given performance target from the plurality of different, previously-stored performance targets.

4. The mobile machine of claim 3 wherein the performance target selection component generates a user interface display with a target selection user input mechanism and receives a target selection user input selecting the given performance target from the plurality of different, previously-stored performance targets.

5. The mobile machine of claim 3 wherein the performance target selection component obtains a set of one or more search criteria, including a location indicator indicating a location of the mobile machine, and identifies the given performance target based on the one or more search criteria.

6. The mobile machine of claim 2 wherein the control system comprises: a setting control system that generates the action signal based on a difference between the current performance metric value and the performance target metric value in the given performance target.

7. The mobile machine of claim 6 wherein the setting control system generates the action signal as a user interface signal that generates a user interface indicative of the adjustments to the machine settings.

8. The mobile machine of claim 6 wherein the setting control system generates the action signal as a control signal that is provided to the set of controlled systems to automatically make the adjustments to the machine settings.

9. The mobile machine of claim 2 and further comprising: a performance target saving component that receives a user input and, in response, saves the current performance metric value as an additional performance target.

10. A method, comprising:
 sensing operating characteristics of a mobile machine operating on a crop of a crop type;
 calculating a set of current performance metric values for the mobile machine indicative of current performance levels of the mobile machine based on the sensed operating characteristics;
 obtaining, on the mobile machine, a given performance target based on the crop type, from a plurality of different, previously-stored performance targets, the given performance target including a set of performance target metric values indicative of previously-stored performance metrics and target performance levels of the mobile machine, wherein the performance targets are based on data obtained from one or more other mobile machines operating on a crop of a same crop type as the mobile machine; and
 controlling a set of controlled systems on the mobile machine based on a difference between the current performance metric values and the set of performance target metric values in the given performance target.

11. The method of claim 10 wherein the mobile machine comprises an agricultural machine.

12. The method of claim 11 wherein obtaining comprises:
 receiving an operator selection input identifying one or more search criteria;
 displaying a set of the plurality of different, previously-stored performance targets based on the one or more search criteria; and
 receiving an operator selection input selecting one of the displayed performance targets as the given performance target.

13. The method of claim 12 and further comprising:
 receiving an operator input; and
 in response, saving the current performance metric values as an additional performance target.

14. The method of claim 12 wherein obtaining comprises:
 obtaining one or more index values;
 searching a target store that stores the plurality of different, previously-stored performance targets based on the one or more index values; and
 identifying the given performance target.

15. A method, comprising:
 sensing operating characteristics of a first mobile machine operating on a crop of a crop type;
 calculating a set of performance metrics indicative of a performance level of the first mobile machine based on the sensed operating characteristics;
 saving the calculated set of performance metrics as one performance target, wherein the performance target is one of a plurality of different, saved performance targets of the first mobile machine;

retrieving, by the first mobile machine, a given performance target indicative of a performance metric generated based on data obtained from a second mobile machine operating on a crop of a same crop type as the first mobile machine; and controlling operation of the first mobile machine based on the given performance target.

16. The method of claim 15 wherein saving the calculated set of performance metrics as one performance target, of the plurality of different, saved performance targets comprises one of:

saving the one performance target to a local data store on the first mobile machine; and saving the one performance target to a remote server environment.

17. The method of claim 15 and further comprising:

obtaining a set of index values corresponding to the one performance target; and saving the set of index values along with the one performance target.

18. The method of claim 17 wherein retrieving comprises:

generating a user interface display with a search user input mechanism that is actuated to receive user search inputs;

receiving user actuation of the search user input mechanism; and searching for the given performance target based on the user search inputs and the index values corresponding to the given performance target.

* * * * *